UNITED STATES PATENT OFFICE.

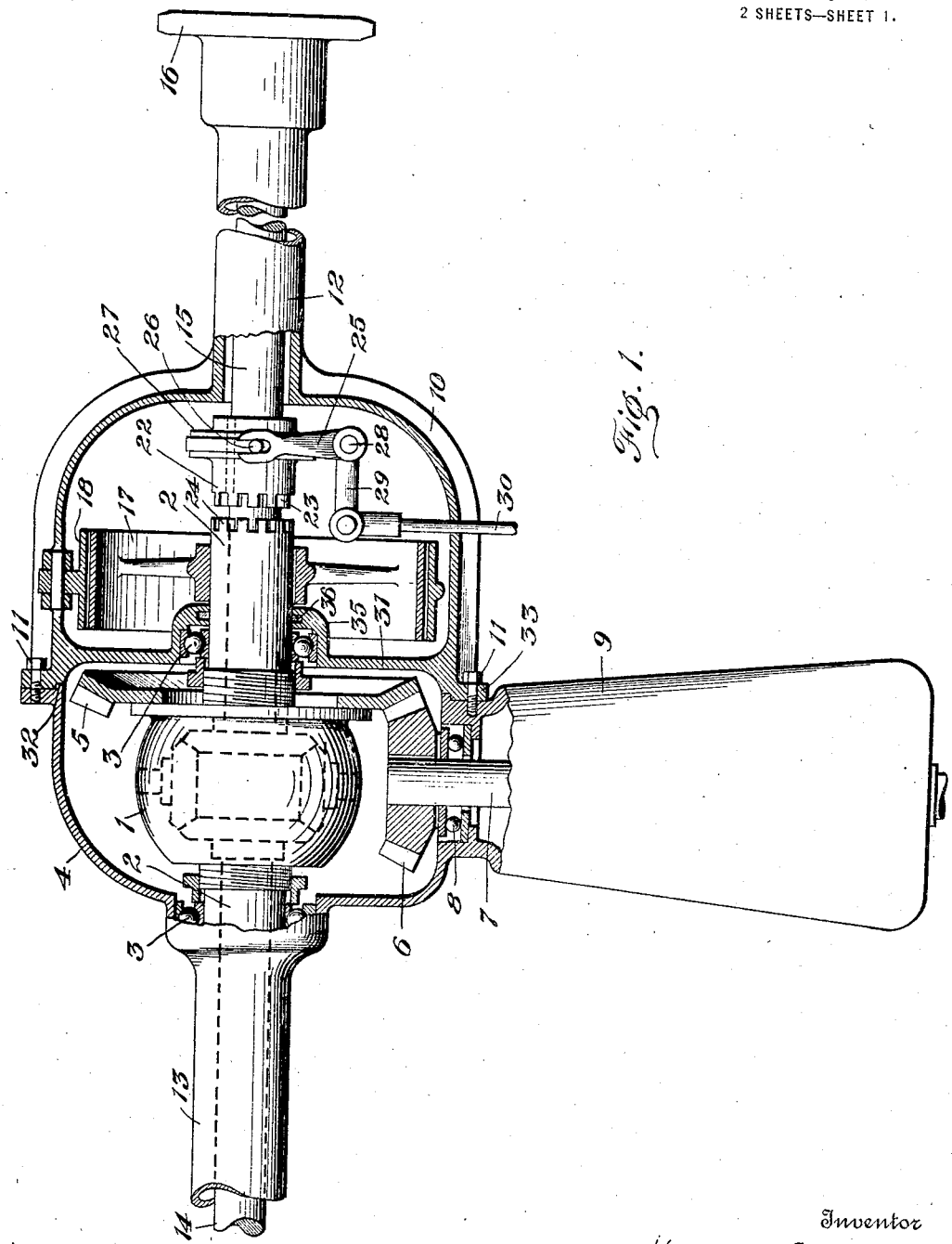

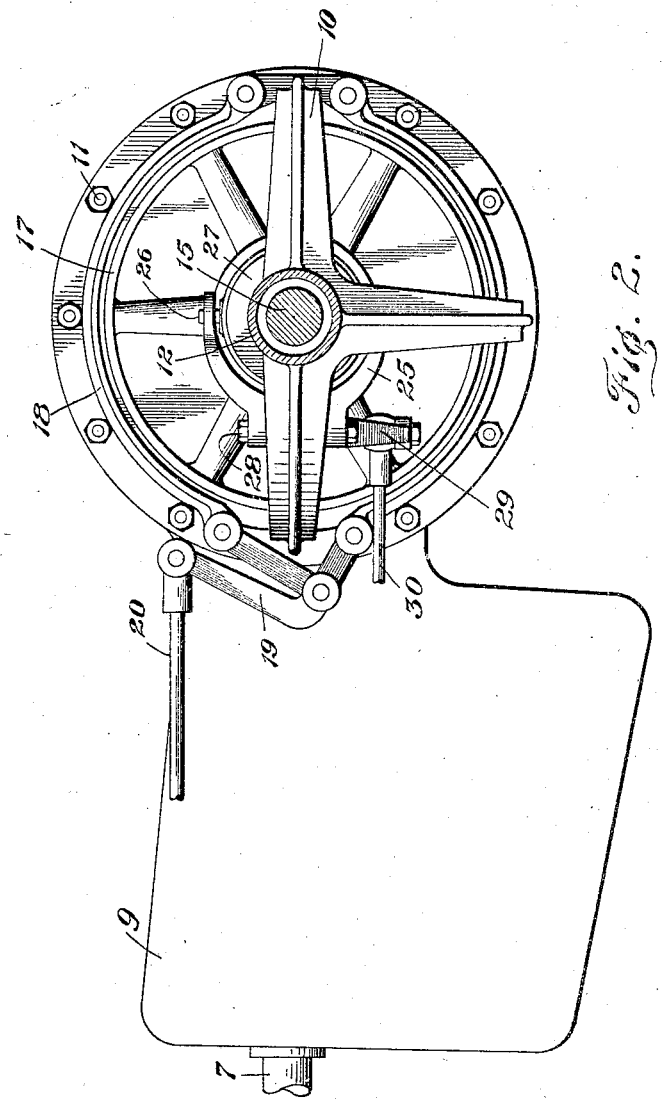

VINCENT LINK, OF DETROIT, MICHIGAN.

AUTOMOBILE TRANSMISSION MECHANISM.

1,189,368.

Specification of Letters Patent.

Patented July 4, 1916.

Application filed June 21, 1912. Serial No. 704,962.

*To all whom it may concern:*

Be it known that I, VINCENT LINK, a citizen of the United States of America, residing at Detroit, in the county of Wayne and State of Michigan, have invented certain new and useful Improvements in Automobile Transmission Mechanism, of which the following is a specification, reference being had therein to the accompanying drawings.

This invention relates to transmission mechanism for automobiles and more particularly to an emergency gearing for locking differential mechanism whereby accident that disables either drive shaft of the differential does not completely disable the car.

Another feature of the invention is an arrangement of the service brake whereby it is instantly accessible for inspection, repair and renewal of the brake drum and shoe and whereby all lubricants are kept away from the friction faces of the brake.

The invention consists in the matters hereinafter set forth, and more particularly pointed out in the appended claims.

Referring to the drawings, Figure 1 is a plan view, partly in section, of a mechanism embodying features of the invention; and Fig. 2 is a view in end elevation thereof.

In the drawings an outer rotary member 1 of a differential gearing of any preferred type, has tubular extensions or sleeves 2 each journaled in suitable friction and thrust bearings 3 in an outer casing 4. A follower pinion 5 that rotates the member 1 is in mesh with a drive gear 6 secured to the inner end of the follower or transmission shaft 7 which extends through a suitable friction bearing 8 in the wall of the main casing 4 from any preferred form of variable speed and reverse mechanism whose casing 9 is integral with and a part of the main casing 4.

A yoke frame 10, suitably ribbed and flanged to combine strength with lightness, is detachably secured as by suitable bolts or studs 11 to an end of the casing 4 and has a bearing sleeve 12 extending therefrom in axial alinement with an oppositely extending sleeve 13 preferably integrally formed on the main casing 4. A two part transmission shaft of the differential has one member 14 suitably journaled in the sleeve 13 and another arm 15 similarly rotatably secured in suitable bearings in the yoke 10, the inner ends of the members being journaled in the sleeves 2 and operatively connected with the member 1 through any of the usual forms of compensating gearing. The outer ends of these shaft members may be provided with sprocket wheels 16 in case the mechanism is used for a double side chain drive, or may have provision for reception of the usual traction bearing wheels of an automobile. A brake drum 17 is secured on the sleeve 2 within the yoke 10 and is encircled by any preferred form of brake band indicated at 18 carried by the yoke in the usual manner and arranged to be tightened by a lever 19 and brake rod 20 continued to the operator's station.

A clutch sleeve 22 is non-rotatably reciprocable on the shaft member 15 and is provided with end notches 23 adapted to engage with mating teeth 24 on the adjacent end of the tubular member 2, or is otherwise arranged to interlock with the driving member of the differential gearing. A slotted yoke 25 engaging the clutch sleeve 22 has pins 26 or like members engaging a groove preferably formed by a pair of peripheral flanges 27 on one end of the gudgeon sleeve. The yoke is pivoted on a suitable stud 28 and may be shifted longitudinally by means of a rock arm 29 and an operating rod or link 30 carried to any convenient point.

In order to insure accuracy of alinement the yoke 10 is formed integrally on the end plate 31 of the casing 4 and the latter has a slight circular centering flange 32 entering a corresponding rabbet in the face of a marginal flange 33 formed on the adjacent face of this end plate 31. To prevent oil or other lubricant from working out on to the brake drum a hub 35 on the end plate which houses the bearing 3 is arranged to closely encircle the member 2 beyond the bearing and hold a washer 36 around the member.

In operation the differential mechanism transmits motion through the two members of its shaft in the usual manner so long as the clutch sleeve is disengaged from the differential member sleeve. If, however, for any reason one of the connections on the end of the shaft breaks, as is liable to occur with a jack shaft and side drive construction, the operator may positively lock one of the members of the shaft to rotate with the differential driving members by means of the clutch sleeve. This causes the two parts of the shaft to turn together so that the vehicle to which the mechanism is applied is driven temporarily through the unbroken connection. This prevents crippling of the vehicle through breakage of one of the traction wheel connections.

Another feature of the invention is its simplicity inasmuch as the transmission casing and the main casing of the differential together with one of the tubular shaft extensions are in one, the yoke frame supporting the brake drum being so constructed as to be held in true alinement when placed in position on the casing end. The brake drum and strap are outside the transmission casing so that lubricant cannot reach them and consequently they are always effective. Furthermore the yoke permits the ready removal and replacement of the brake strap which of course is necessarily renewed at regular intervals.

Obviously, changes in the details of construction may be made without departing from the spirit of the invention and I do not care to limit myself to any particular form or arrangement of parts.

What I claim as my invention is:—

1. In an automobile, an outer casing having a tubular extension, a yoke on the casing, a tubular extension thereon in axial alinement with the casing extension, a differential gear casing having oppositely extending sleeves journaled in the outer casing in axial alinement with the outer casing extensions, a two-part shaft journaled in the extension whose adjacent ends inside the gear casing are connected to the latter to rotate differentially, a shaft member in the outer casing connected to the gear casing to positively rotate the latter, a brake drum on one of the gear casing sleeves outside the outer casing, and means on the yoke for frictionally engaging the drum.

2. In an automobile, an outer casing having a tubular extension, a yoke on the casing, a tubular extension thereon in axial alinement with the casing extension, a pair of oppositely disposed end thrust bearings in the outer casing in axial alinement with the casing extensions, a differential gear casing having oppositely extending sleeves journaled in the bearings in axial alinement with the outer sleeves, a two-part shaft journaled in the extensions whose adjacent ends inside the gear casing are connected to the latter to rotate differentially, a drive shaft in the outer casing connected to the gear casing to positively rotate the latter, a brake drum on one of the gear casing sleeves outside the outer casing, and means on the yoke for frictionally engaging the drum.

3. In an automobile, an outer casing having a tubular extension, a yoke on the casing, a tubular extension thereon in axial alinement with the casing extension, a differential gear casing having oppositely extending sleeves journaled on the outer casing in axial alinement with the outer casing extensions, a two-part shaft journaled in the extensions whose adjacent ends inside the gear casing are connected to the latter to rotate differentially, a drive shaft in the outer casing connected to the gear casing to positively rotate the latter, a clutch sleeve non-rotatably reciprocable on one of the shaft members adapted to non-rotatably interlock with the gear casing, and means for shifting the sleeve.

4. In an automobile, an outer casing having a tubular extension, a yoke on the casing, a tubular extension thereon in axial alinement with the casing extension, a differential gear casing having oppositely extending sleeves journaled on the outer casing in axial alinement with the outer casing extensions, a two-part shaft journaled in the extensions whose adjacent ends inside the gear casing are connected to the latter to rotate differentially, a drive shaft in the outer casing connected to the gear casing to positively rotate the latter, a clutch sleeve non-rotatably reciprocable on one of the shaft members adapted to non-rotatably interlock with the gear casing, and means for shifting the sleeve, the shaft ends being so connected that they rotate positively at the same speed when one of the shaft members is positively interlocked with the gear casing.

In testimony whereof I affix my signature in presence of two witnesses.

VINCENT LINK.

Witnesses:
OTTO F. BARTHEL,
ANNA M. DORR.